United States Patent
Stocks et al.

(10) Patent No.: US 9,443,191 B1
(45) Date of Patent: Sep. 13, 2016

(54) BIOMIMETIC SENSOR AND METHOD FOR CONFIGURING BIOMIMETIC SENSOR

(71) Applicants: Nigel G Stocks, Coventry (GB); Alexander Nikitin, Coventry (GB); Adi R. Bulsara, San Diego, CA (US)

(72) Inventors: Nigel G Stocks, Coventry (GB); Alexander Nikitin, Coventry (GB); Adi R. Bulsara, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 212 days.

(21) Appl. No.: 14/039,627

(22) Filed: Sep. 27, 2013

(51) Int. Cl.
*G06N 3/063* (2006.01)
*G06N 3/06* (2006.01)

(52) U.S. Cl.
CPC .................... *G06N 3/0635* (2013.01)

(58) Field of Classification Search
None
See application file for complete search history.

(56) References Cited

U.S. PATENT DOCUMENTS

2005/0182590 A1* 8/2005 Kotter et al. ............... 702/127
2011/0035215 A1* 2/2011 Sompolinsky et al. ...... 704/231
2012/0084241 A1* 4/2012 Friedman et al. ............ 706/27

OTHER PUBLICATIONS

Chacron, M., et al. "Negative interspike interval correlations increase the neuronal capacity for encoding time-dependent stimuli." The Journal of Neuroscience 21.14 (2001): pp. 5328-5343.*
Farkhooi et al., Serial correlation in neural spike trains: Experimental evidence, stochastic modeling, and single neuron variability, Phys. Rev. E 79:0219051-10 (2009).
Chacron et al., "Suprathreshold Stochastic Firing Dynamics with Memory in P-Type Electroreceptors", Phys. Rev. Lett, 85:7:1576-1579 (Aug. 24, 2000).
Ratnam et al., "Nonrenewal Statistics of Electrosensory Afferent Spike Trains: Implications for the Detection of Weak Sensory Signals", J Neuroscience, 20(17):6672-6683 (Sep. 1, 2000).
Chacron et al., "Threshold fatigue and information transfer", J Comput. Neurosci, 23:301-311 (2007).
Mar et al., "Noise shaping in populations of coupled model neurons", Proc. Natl. Acad. Sci., 90:10450-10455 (Aug. 1999).
Chacron et al., "Noise Shaping by Interval Correlations Increases Information Transfer", Phys. Rev. Lett., 92 (8):080601-4 (Feb. 27, 2004).
Nikitin et al., "Enhancing the Resolution of a Sensor Via Negative Correlation: A Biologically Inspired Approach", Phys. Rev. Lett., 109:2381031-4 (Dec. 7, 2012).

* cited by examiner

*Primary Examiner* — Kakali Chaki
*Assistant Examiner* — Eric Nilsson
(74) *Attorney, Agent, or Firm* — SPAWAR Systems Center Pacific; Kyle Eppele; J. Eric Anderson

(57) ABSTRACT

The dynamics of a nonlinear sensor are configured to mimic threshold crossing dynamics of an integrate-fire neuron with negatively correlated inter-spike intervals. The configuration of the sensor results in a biomimetic sensor that provides results with an accuracy that mimic neuron sensing.

7 Claims, 5 Drawing Sheets

BIOMIMETIC SENSOR AND METHOD FOR CONFIGURING BIOMIMETIC SENSOR

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619)553-5118; email: ssc_pac_t2@navy.mil. Reference Navy Case No. 101,922.

BACKGROUND

Sensors that operate in the presence of a noise-floor (either due to external noise or noise caused by the sensor) need to be configured or have readout strategies that allow the detection of very small target signals. Standard techniques for accounting for such noise include using a long observation time to collect a large amount of data which can then be suitably averaged to yield, for instance, a power spectral density that is almost noise-free. Typically, mathematical algorithms, such as fast Fourier Transforms, are used to produce such averaged results. It is generally accepted, however, that the human brain does not compute fast Fourier transforms. In addition, the brain carries out tasks such as pattern recognition in a minimal amount of time (usually a few msec). While there have been investigations into "noise shaping" in biological neurons, there have not yet been any applications to nonlinear dynamic sensors. Noise shaping reduces the noise floor in low-frequency signals, thereby rendering them more easily detectable. It would be desirable to configure a sensor such that it is able to provide measurements with optimal accuracy, such as those achieved by the brain.

SUMMARY

According to one embodiment, a device includes a biomimetic sensor with dynamics configured to sense occurrence of a temporal event with an accuracy that mimics neuron sensing and an output configured to provide an output corresponding to the sensed event. The dynamics of the sensor may be configured to mimic threshold-crossing dynamics of an integrate-fire neuron with negatively correlated inter-spike intervals.

According to another embodiment, a method for configuring and operating a biomimetic sensor includes configuring the sensor to sense occurrence of a temporal event with an accuracy that mimics neuron sensing. The dynamics of the sensor may be configured to mimic threshold-crossing dynamics of an integrate-fire neuron with negatively correlated inter-spike intervals. The method further includes sensing occurrence of the temporal event and providing an output corresponding to the sensed event.

BRIEF DESCRIPTION OF THE DRAWINGS

The following description may be best understood from the accompanying drawings.

DETAILED DESCRIPTION

Figure 1:
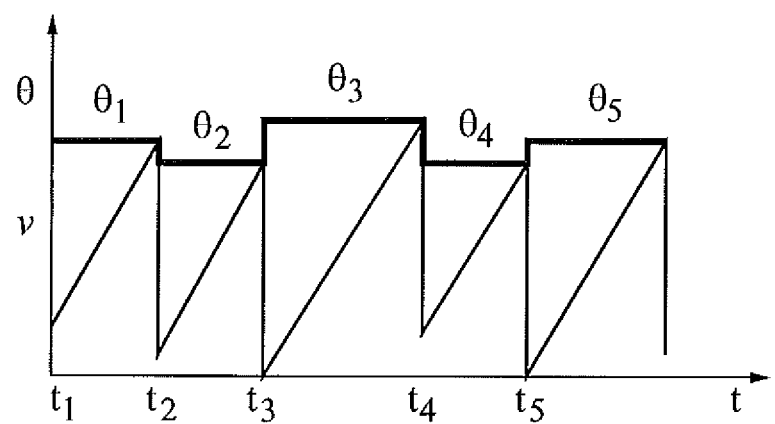
FIG. 1 illustrates a perfect integrate-fire (PIF) model of dynamics of a cell membrane voltage over time.

In any measurement, one aspires to the highest possible accuracy. If the accuracy of a single measurement is not acceptable, due to unacceptable measurement errors, e.g., errors stemming from a noise-floor, then the measurements are typically repeated N times, and a statistical average (usually just the arithmetic mean) of the measurable is computed. For statistically independent errors, the total error of the measurement is reduced as $1/\sqrt{N}$. That is, the accuracy of the measurement improves slowly in comparison to the rate of accumulation of the statistical data that is part of the averaging operation. According to illustrative embodiments described herein, an improved scaling, that is an improved rate of the reduction for measurement error with accumulating statistical data, is possible if the measurements are negatively correlated.

According to illustrative embodiments, a sensor may be designed as an analog of a biological system which has qualitative matching dynamics. The configuration and operation of a nonlinear sensor having a temporal, e.g., an event-based, readout can be adapted to mimic the dynamics of an integrate-fire neuron with negatively correlated inter-spike intervals. A sensor operating in this mode may be referred to as a "biomimetic" sensor. A sensor operating in a "biomimetic" mode yields a greatly reduced measurement error with the improved scaling 1/N, when certain constraints (that will be quantified below) are met.

As an aid to understanding the invention, the following description is directed to a simple neural dynamical model, referred to herein as a perfect integrate-fire (PIF) model. This model is used to explain the concept of "negative correlations". The description that follows also introduces a definition of the neuron's resolution. The following description also includes an explanation of a simple nonlinear dynamic sensor, a single-core fluxgate magnetometer, that operates in the time domain and whose dynamics can be mapped to the integrate-fire neural dynamics. Operating the magnetometer in this "biomimetic mode" is shown to lead to improved magnetic signal detection.

Referring first to a perfect integrate-fire (PIF) neuron model, a PIF model with noise threshold can be described by the following equation:

$$v = \beta + s \qquad (1)$$

where s is the (constant) signal to be estimated, β a constant bias current, and v the voltage across the nerve membrane. The threshold θ is a uniformly distributed random variable, $\theta \in [\theta_a - D_v, \theta_a + D_v]$, that is independently defined for every inter-spike interval. $D_v$ is the noise intensity, and $\theta_a$ is the mean threshold $\theta_a = \langle \theta \rangle$.

The mode of operation is as follows: when the voltage v reaches the threshold θ, a spike is fired, a new threshold is chosen, and the voltage is reset to a new level $\eta = \theta - \theta_a$. This may be understood with reference to FIG. 1 which illustrates a PIF model of dynamics of a cell membrane voltage v over time with a threshold θ.

As can be seen in FIG. 1, the interspike intervals (ISIs) generated by the model given in Equation 1, with the above configuration of the threshold following each firing event, are strongly negatively correlated.

Denoting the times at which the level crossings occur $t_0$, $t_1, \ldots, t_k$, as the values of the threshold at crossing as $\theta_0$, $\theta_1, \ldots, \theta_k$, and the reset levels as $\eta_0 = \theta_0 - \theta_a, \ldots, \eta_k = \theta_k - \theta_a$, it follows that from Equation 1 that the $k^{th}$ interspike interval (ISI) is given by:

$$T_k = (T_k - T_{k-1}) = \frac{\theta_k - \theta_{k-1} + \theta_a}{\beta + s} \quad (2)$$

Decomposing the inter-spike interval $T_k$ into three quantities, Equation (2) becomes $T_k = \delta_k + \Delta - \delta_{k-1}$, where "jitters" $\delta_{k-1}$ and $\delta_k$ are introduced as $\delta_k = \theta_k/(\beta + s)$, $\delta_{k-1} = \theta_{k-1}/(\beta + s)$ and the mean inter-spike interval is introduced as:

$$\Delta = \langle T_k \rangle = \theta_a/(\beta + s) \quad (3)$$

If the threshold is noiseless, and the signal s=const, then the process is exactly periodic because the spikes occur, precisely, at times $t_k = k\Delta + t_0$.

The serial correlation coefficient of the stochastic process can be calculated as:

$$p(m) = \frac{\langle (T_k - \langle T_k \rangle)(T_{k+m} - \langle T_{k+m} \rangle) \rangle}{\sigma_{T_k} \sigma_{T_{k+m}}} = \begin{cases} 1 : m = 0, \\ -\frac{2}{2} : m = 1, \\ 0 : m > 1, \end{cases} \quad (4)$$

It can be seen that ISIs generated by the model given in Equation (1) are strongly negatively correlated with $p(1) = -0.5$.

Introducing the sum of N inter-spike intervals yields the equation:

$$T_{ab,N} = \sum_{k=1}^{N} T_k = \delta_N - \delta_a + N\Delta \quad (5)$$

This is equivalent to an observation time in the measurement. The average of this sum is the mean observation time:

$$T_{ab} = \langle \tau_{ab,N} \rangle = N\Delta \quad (6)$$

The variance, which is given by:

$$\sigma_{T_{ab,N}}^2 = 2\sigma_\delta^2 \quad (7)$$

is independent of N. This means that the noise in a measurement using the PIF model does not accumulate with an increasing number (N) of measurements. This is a direct result of the noise canceling mechanism that makes it attractive for practical applications to engineered systems.

To characterize the accuracy of the signal s estimation from the ISIs, the resolution R is defined as:

$$R = \left| \frac{\partial T_{ab,N}}{\partial s} \right|^{-1} \bigg|_{\sigma_{T_{ab,N}}} \quad (8)$$

R is the smallest resolvable value of the measured quantity. The resolution is readily derived via a Taylor expansion of $T_{ab}$ about $s=0$: $T_{ab}(\delta s) = T_{ab}(0) = dT_{ab}/ds \times \delta s$. Noting that, physically, the resolution represents the signal value that results in $\sigma_{Tab,N}$ being equal to the difference in $T_{ab}$ with and without signals, then the resolution is given by $dT_{ab}/ds \times \delta s$ where the differential is evaluated at $s=0$. Finally, setting $\delta s = R$ when $\sigma_{Tab,N} = T_{ab}(0) - T_{ab}(s)$, the resolution R can be obtained for the PIF model in the limit of very small target signal as:

$$R = \left| \frac{\partial}{\partial s} \frac{N\theta_a}{\beta + s} \right|^{-1}_{s=0} \sqrt{2} \, \sigma_\delta = \frac{\sqrt{2} \, \sigma_\delta \beta^2}{\theta_a} \frac{1}{N} \quad (9)$$

This is proportional to 1/N, which is an improvement over the $1/\sqrt{N}$ dependence for typical renewal processes (without negative correlations). A smaller value for R implies better signal detection/quantification performance.

Referring now to an example of a magnetic field sensor operating in a biomimetic mode, the PIF model, introduced above, can be characterized by (i) the dependence (i.e., rise) of the membrane voltage with an external signal, and (ii) a comparator which imposes the threshold which in turn, triggers (iii) a resetting mechanism. To operate in the "biomimetic mode", a sensor mimics the oscillatory dynamics of the PIF model with negative correlations in its inter-spike intervals to exploit the noise canceling mechanism.

Now consider the dynamics of a fluxgate magnetometer that is operated in the temporal domain. Those skilled in the art will appreciate that the relaxation time of the magnetization variable in a ferromagnetic core depends on an applied external magnetic field. By altering the directions of the applied magnetic field, conditions for the ferromagnetic core can be generated under which its magnetization will periodically increase and decrease. That is the ferromagnetic core will oscillate (with non-sinusoidal oscillations).

According to an illustrative embodiment, the ferromagnetic core dynamics can be mapped onto a PIF neuronal model by associating the increasing magnetization of the ferromagnetic core with an increasing membrane voltage of the cell membrane and associating the decreasing magnetization of the ferromagnetic core with a reset in the cell membrane voltage.

For a practical realization of a biomimetic sensor, there are some engineering considerations that must be taken into account. First, the magnetization is an internal parameter of the ferromagnetic core, which is not easy to measure directly. Therefore, the magnetization may be replaced in the measurements with the B-field that is a linear combination of an unknown field $B_0$ (the target field that is to be measured), the known field $B_+$ that is used to induce the relaxation dynamics, and the magnetization M, such that the B-field is given by the equation:

$$B = B_a + B_+ + \mu_0 M \quad (10)$$

where $\mu_0$ is the magnetic constant. Since $B_0$ and $B_+$ are assumed to be constants during the relaxation process, the B field relaxes like the magnetization with the rate $dB/dt=\mu_0 dM/dt$. Having made the change in variables, the B field sensor can be used, with a very sharp sigmoidal characteristic, as a comparator of the B field with a threshold $\theta$ that will trigger the reset mechanism. This may be understood with reference to FIG. 2A which illustrates the operation of a magnetic field sensor (also referred to as a magnetometer) which senses increasing magnetization.

Figure 2A:
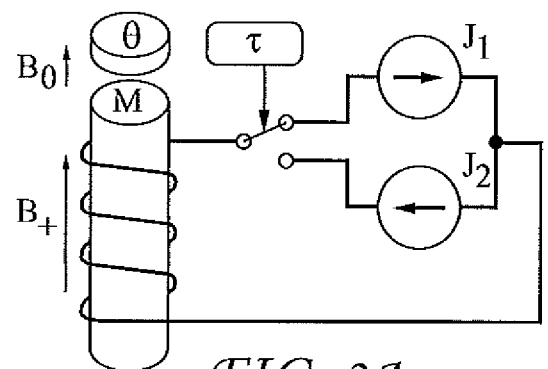
FIGS. 2A and 2B illustrate operation of a magnetic field sensor configured to mimic a PIF model according to an illustrative embodiment.

Referring to FIG. 2A, the magnetization M increases in the presence of magnetic fields $B_+$ and $B_0$. The magnetic field $B_+$ is assumed to be $>>|B_0|$ and correspond the current $J_1$ in the coil.

Figure 2B:
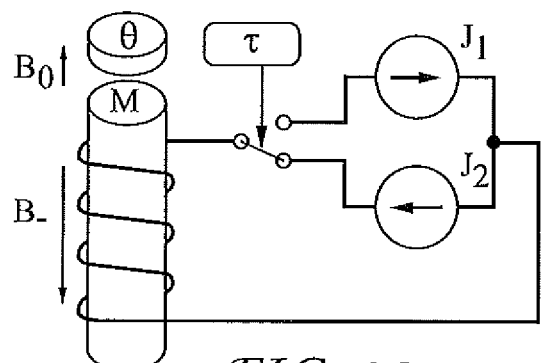

A second engineering consideration that needs to be taken into account stems from the impossibility of, instantly, resetting the magnetization M in the ferromagnet. To reset the magnetization, the magnetic field $B_+$ needs to be replaced with $B_-$, and this field is applied for duration $\tau$, to the magnetization to reach an acceptable level. This level is a design parameter that is controlled by selection of time interval $\tau$ for optimal performance. This may be understood with reference to FIG. 2B which illustrates resetting of the core. Resetting of the core magnetization occurs when it reaches a threshold value $\theta$ in the magnetic comparator. At this point, the current $J_1$ in the coil is replaced by the current $J_2$ for a time interval $\tau$. This corresponds to a magnetic field switch from $B_+$ to $B_-$ with an attendant coil current $J_2$.).

The dynamics of the magnetization M of a single-domain ferromagnetic core in the one dimensional case can be described by the following differential equation:

$$\tau_a \frac{dM}{dt} = -M + M_s \tanh\left(\frac{cB}{\mu_0}\right) \quad (11)$$

where $M_s$ is the saturation level of the magnetization, and $\tau_a$ is its characteristic relaxation time. In Equation (11), C is a non-linearity parameter that is proportional to the Curie temperature-to-temperature ratio. The parameter C characterizes the 'ferromagnet-paramagnet' phase transition. If $C>1$, the core remains in its ferromagnetic phase. If $C<1$, the core is in the paramagnetic phase.

Figure 3:
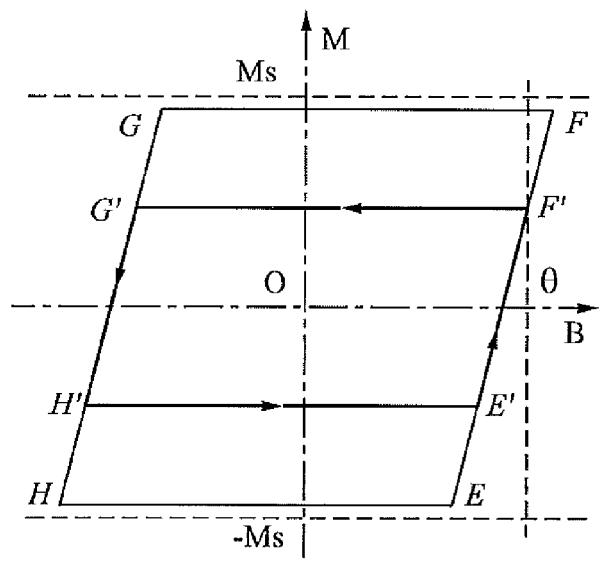
FIG. 3 illustrates a phase plane of a ferromagnetic oscillator.

Now consider the magnetization in two operating scenarios: a noiseless scenario and a noise filled scenario. In the noiseless case, the magnetic sensor mimics a periodic oscillator. The may be understood with reference to FIG. 3 which illustrates a phase plane of a ferromagnetic oscillator. Referring to FIG. 3, a working region of the parameters M and B is shown as bounded by the sections (branches) EF and GH. All the nonlinear dynamics occur on these branches. Switches between the branches occur in two cases: when the B field crosses the threshold level $\theta$ (shown in FIG. 3 by a vertical dashed line), and when the system is forced to the branch GH for a duration $\tau$.

The points E, F, G and H shown in FIG. 3 have the following coordinates:

$$E = [B_0 + B_+ + \mu_0 M_H, M_H] \quad (12)$$
$$F = [B_0 + B_+ + \mu_0 M_F, M_F]$$
$$G = [B_0 + B_- + \mu_0 M_F, M_F]$$
$$H = [B_0 + B_- + \mu_0 M_H, M_H]$$

where the parameters $M_H$ and $M_F$ can be found from the equation $dM/dt=0$. This condition leads to the transcendental equations:

$$M_H = M_S \tanh\left(C\frac{B_0 + B_-}{\mu_0} + CM_H\right)$$
$$M_F = M_S \tanh\left(C\frac{B_0 + B_+}{\mu_0} + CM_F\right)$$

whose solutions $M_H$ and $M_F$ can be found numerically (assuming that $-M_s<M_H<M_F<M_s$). It may be observed that the working region may be less than the physically permitted states [B,M] of the oscillator. The true region of acceptable values for the magnetization would, normally, be bounded by the saturation values $-M_s$ and $M_s$ (shown in FIG. 3 by respective horizontal dashed lines) instead of $M_H$ and $M_F$. However, the concern here is with the working region of the phase plane that is acceptable for the periodic oscillations, i.e., the region where an attractor can be located.

Referring again to FIG. 3, a limit cycle (attractor) is shown by the quadrilateral E'F'G'H'. The arrows indicate the direction of motion on the phase plane. Suppose a trajectory of the dynamical system starts at E' where, according to the equation $B=B_0+B_++\mu_0 M$, the magnetization M is linearly dependent on the B field. Both M and B are non-linearly growing quantities due to Equation (11). As the B field crosses the threshold $\theta$ (point F'), the trajectory is instantly switched to the point G'. Now the trajectory, according to Equation (11), relaxes during the time interval $\tau$ to the point H'. Then, the trajectory instantly switches onto the branch EF (the point E'). It can be seen from FIG. 3 that, for existence of periodic oscillations, the threshold $\theta$ should satisfy the condition:

$$B_0+B_++\mu_0 M_H<\theta<B_0+B_++\mu_0 M_F$$

If $\theta>B_0+B_++\mu_0 M_F$ (the vertical dashed line does not cross the branch EF), then F is a stable point. It should be noted that a discrete two-state dynamical characterization is used here. That is, for simplicity, instantaneous switches and the resetting time $\tau$ are used instead of a system of differential equations and their solutions. This means that a bifurcation (e.g., of saddle-node type) occurs at $\theta=B_0+B_++\mu_0 M_F$ that may not be entirely correctly characterized without the full differential equations to characterize the dynamical behavior (i.e., the switching events and the resetting mechanism). The above treatment (assuming the device to behave like a static nonlinearity) is valid as long as the characteristic time constant is the smallest time-scale in the system.

Now consider a threshold noise case in which noise is introduced in the threshold $\theta$ as a uniformly distributed variable in the interval $[\theta_a-D_u:\theta_a+D_u]$. According to the analysis of the magnetic sensor model given above, the sensor output will retain its oscillatory properties if the parameters of the threshold noise satisfy the following inequalities: $\theta_a-D_u>M_H$ and $\theta_a+D_u<M_F$. It is important to note that, for modeling purposes, all noise sources are assumed to be internal to the sensor as the resolution is an intrinsic property of the sensor and cannot be defined in the presence of external noise. These are "consolidated" into an effective threshold noise.

Numerical simulations of Equation (11) have shown that the level that the magnetization is reset to is strongly dependent on a time interval $\tau$. This may be understood with reference to FIG. 4 which illustrates a correlation coefficient ρ as a function of the lag n (i.e., the number of time intervals between characterized quantities) for different time intervals τ.

Figure 5A:
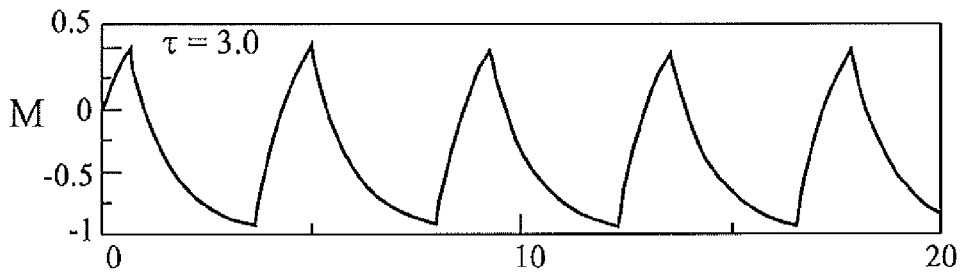
FIG. 5A illustrates magnetization as a function of time for non-correlated intervals.

Referring to FIG. 5A, which illustrates magnetization as a function of time for non-correlated intervals, for large τ, e.g. τ=3, the magnetization approaches the saturation value, and this reduces the negative correlation. This is also observed in the behavior of p(1) for τ=3.0 (in normalized dimensionless units). The reduction in negative correlation occurs because the saturation of the magnetization results in a loss of memory in the magnetization variable when the threshold is crossed. For very strong saturation the magnetization is, effectively, reset to the same value every time with all memory effects being removed.

Figure 4:
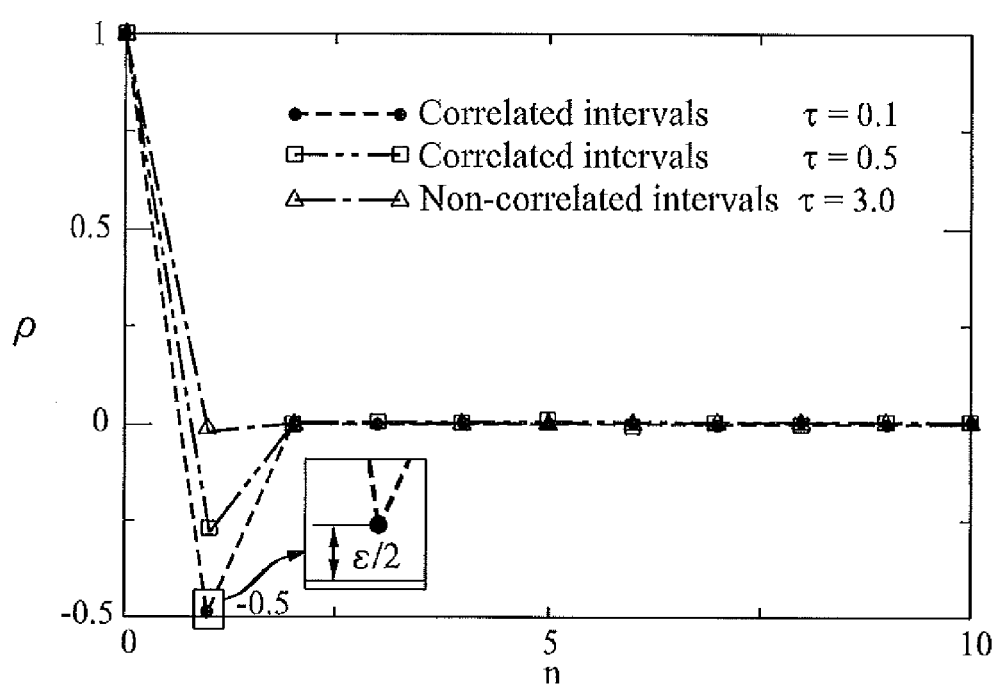
FIG. 4 illustrates the serial correlation coefficient (SCC) as a function of the lag "n" (i.e., the number of time intervals between characterized quantities).
Figure 5B:
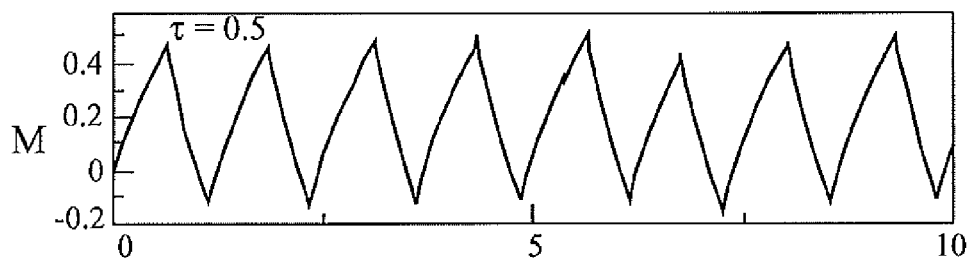
FIG. 5B illustrates magnetization as a function of time for negatively correlated intervals.

In the opposite case, when τ is small, e.g., τ=0.5, the level that the magnetization is reset to strongly depends on the value of the magnetization when the threshold was crossed. Hence, strong negative correlation is observed. This may be understood with reference to FIG. 5B, which illustrates magnetization as a function of time for negatively correlated intervals. The negative correlations can be characterized by the parameter E, introduced as the half distance to −½, as shown in FIG. 4, $$p(1) = -\frac{1}{2} = s/2$$

The target magnetic field $B_0$ can be estimated from N time intervals, $T_i$, t=1, 2, . . . , N as the total observation time $\tau_{ab} = \Sigma_{t=1}^{N} T_t$. The resolution, R, of the magnetic sensor may then be defined via Equation 8 with the replacement $$\sigma_{T_{ab,N}} = \sigma_{T_{ab}} = \sqrt{\langle [\tau_{ab} - T_{ab}]^2 \rangle}$$

with the mean observation time identified as $T_{ab} = \langle \tau_{ab} \rangle$, and $s = B_0$ the target signal.

Figure 6A:
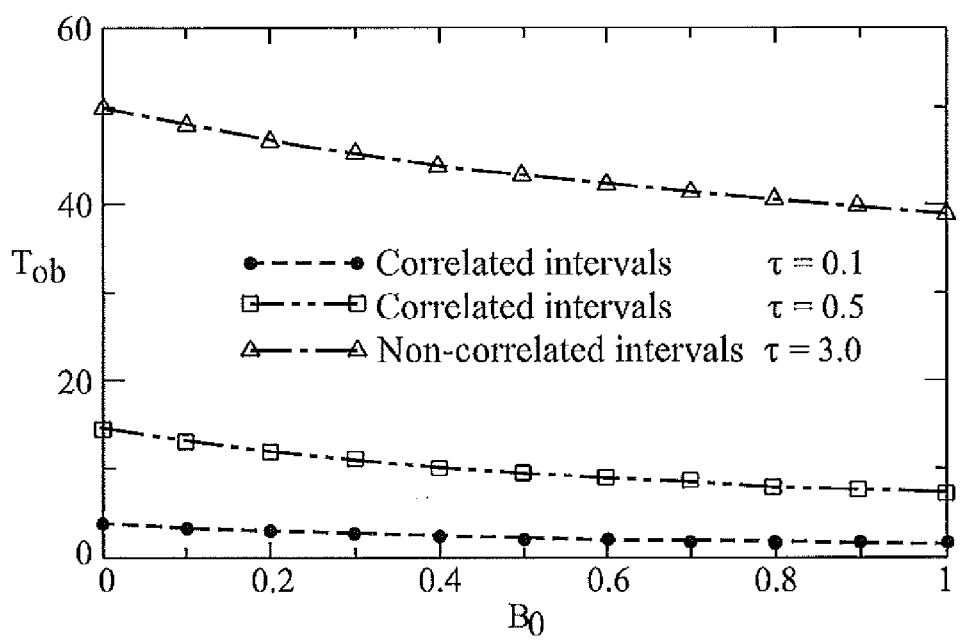
FIG. 6A illustrates observation time as a function of an external magnetic field.

The (monotonic) dependence of the observation time $T_{ab}$ on the external magnetic field $B_0$ is shown in FIG. 6A which illustrates observation time as a function of an external magnetic field. This dependence can be used to estimate the target field.

Figure 6B:
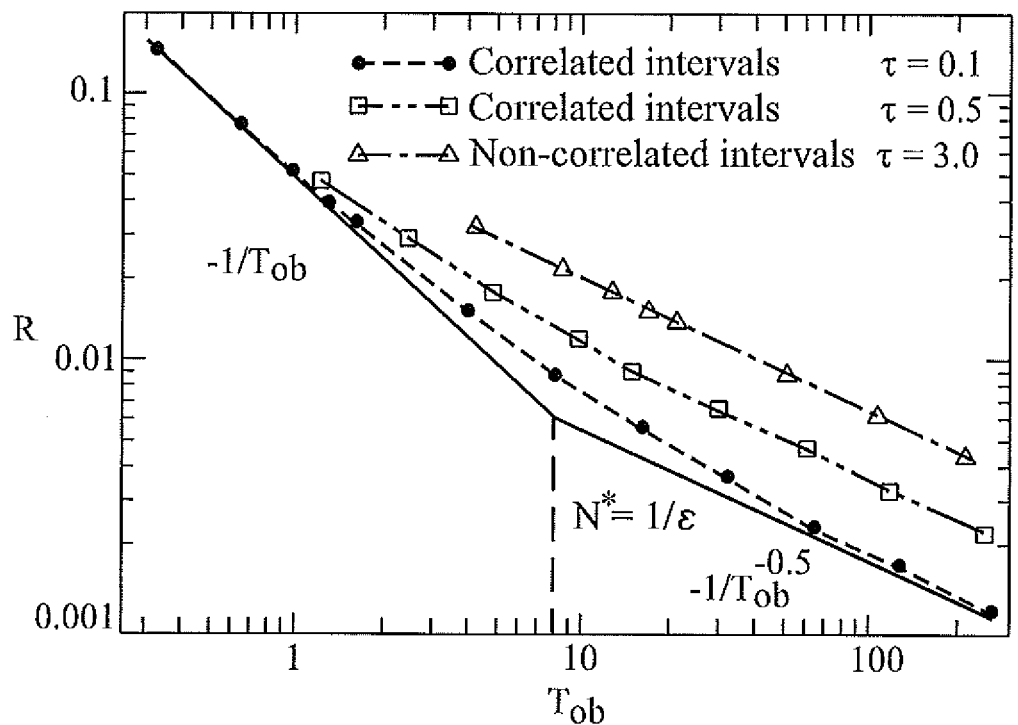
FIG. 6B illustrates resolution versus observation time.

FIG. 6B, which illustrates resolution versus observation time, shows that the resolution, R, has the scaling $T_{ab}^{-0.5}$ for the non-correlated intervals (e.g., for the parameter value τ=3.0). However, when strong negative correlations exist (e.g., for τ=0.1) the scaling is more complex. The scalings $T_{ab}^{-1}$ and $T_{ab}^{-0.5}$ shown as solid straight lines in FIG. 6B are seen to asymptote to the τ=0.1 data at small and large observation times, respectively. This provides clear evidence that, at short observation times, the enhanced scaling $T_{ab}^{-1}$ is observed. This scaling crosses over $T_{ab}^{-0.5}$ at large observation time.

This dual scaling behavior appears to be a universal property in the sense that it occurs for linear and nonlinear reset mechanisms and in models of sensor and neural models. Moreover, the number of periods $N^+$ at which the scaling crosses over from to $T_{ab}^{-0.5}$ is predicted as $N^+ \approx 1/s$ (which may be understood with reference to FIG. 6B. It should be noted that the parameter ϵ can be estimated directly from the numerical results presented in FIG. 4.

To explain the double scaling in the magnetometer model, a solvable model with "deterministic errors" in the reset is described herein. The model is a modified PIF model (MPIF). It differs from the standard PIF model only through a different reset mechanism.

In the PIF model, the resetting levels are $\eta_k = \theta_k - \theta_a$. That is, the resetting level $\eta_k$ is the result of a precisely shifted threshold $\theta_k$. In the MPIF model, the shift of the threshold $\theta_k$ occurs with a "distortion" due to the transformation $$\eta_k = (\theta_k - \theta_a)(1-c)$$

Figure 7:
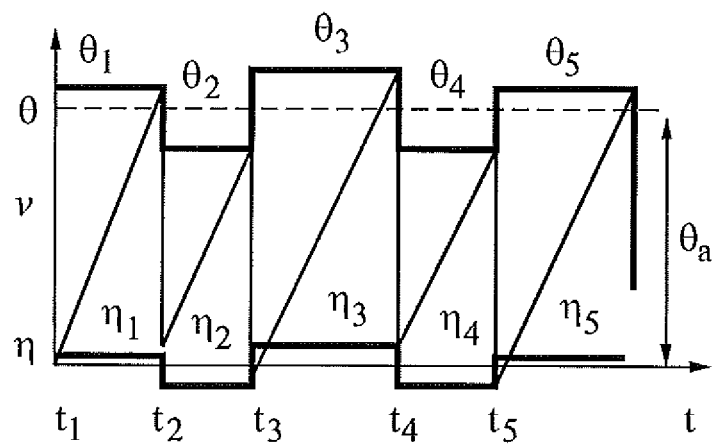
FIG. 7 illustrates a modified perfect integrate-fire (MPIF) model of dynamics of a cell membrane voltage over time.

Referring to FIG. 7, which illustrates a modified PIF model, it can be seen that the function η(t) reproduces the dynamics of θ(t) with a compression on the v-axis. Thus, the parameter c may be referred to as the "compression". If c=0, the MPIF model coincides with the PIF model. For c=1, the resetting occurs at the constant level, $\eta_k = 0$. In this case, it should produce renewal oscillations. Hence, the compression c plays a role similar to the parameter τ in the magnetometer model.

Since the $k^{th}$ inter-spike interval produced by the MPIF model is $$T_k = (t_k - t_{k-1}) = \frac{\theta_k - \theta_{k-1} + (1-c)\theta_a + c\theta_k}{\beta + s} \quad (13)$$

This equation can be decomposed into three variables so that $$T_k = \delta_k + \Delta_k - \delta_{k-1}$$

where the "jitter" terms $\delta_k = \theta_k/(\beta+s)$, $\delta_{k-1} = \theta_{k-1}/\beta+s$, are introduced, and the noisy component of the ISI $$\Delta_k = \frac{\theta_a}{\beta + s} + c\frac{\theta_{k-1} - \theta_a}{\beta + s} \quad (14)$$

is introduced.

The variable $\Delta_k$ in Equation 14 differs from Δ in Equation 3 through a noise component that is proportional to the parameter c. Therefore, the sum N time intervals $$\tau_{ob,N} = \sum_{k=1}^{N} T_k = \delta_N - \delta_0 + N\frac{\theta_a}{\beta + s} + \frac{c}{\beta + s}\sum_{k=0}^{N-1}(\theta_k - \theta_a) \quad (15)$$

includes the noisy term that is proportional to c and increasing with N.

The serial correlation coefficient differs from the one calculated for the PIF model. It has the additional term, $$p(1) = -\frac{1}{2} + \frac{\varepsilon}{2} \quad (16)$$

where the parameter ϵ is introduced as $$\varepsilon = \frac{c^2}{2(1-c) + c^2} \quad (17)$$

For every weak compression, c>>1, the last equation reduces to:

$$\varepsilon \simeq \frac{c^2}{c} \quad (18)$$

It can be shown that the average observation times for both the PIF and the MPIF models are identical, $T_{ab} = \langle \tau_{ab,N} \rangle = N\theta_a/(\beta+s)$, but the variances are different. Moreover, in contrast to Equation 7, the variance for the MPIF model, which is given by:

$$\sigma_{T_{ob,N}}^2 = 2\sigma_\varepsilon^2\left(1 + c + N\frac{c^2}{2}\right) \quad (19)$$

increases with N. This dependence on N influences the resolution R.

The resolution R for the MPIF model in the limit of an infinitesimally small target signal is:

$$R = \frac{\sqrt{2}\,\sigma_\delta \beta^2}{\theta_\alpha} \frac{1}{N}\sqrt{1 + c + N\frac{c^2}{2}} \quad (20)$$

For a very weak compression c>>1, and using the approximation in Equation 18, the resolution $r^R$ for the MPIF model becomes:

$$R = \frac{\sqrt{2}\,\sigma_\delta \beta^2}{\theta_\alpha} \frac{1}{N}\sqrt{1 + \varepsilon N} \quad (21)$$

Now, it can be seen that the resolution R has different scaling for different ranges of N. If N>>1/ε, the resolution is $$R \simeq \frac{\sqrt{2}\,\sigma_\delta \beta^2}{\theta_\alpha} \frac{1}{N}$$

If N<<1/ε, the resolution is $$R \simeq \frac{\sqrt{2}\,\sigma_\delta \beta^2}{\theta_\alpha} \frac{1}{\sqrt{N}}$$

Since the observation time $T_{ab}$ is proportional to N, the resolution also has the double scaling in the terms of the observation times, $1/T_{ab}$ and $1/\sqrt{T_{ab}}$.

It should be appreciated that the description given above of a single core fluxgate magnetometer is provided as an example, and that the invention is not limited to such a sensor. The invention is applicable to any nonlinear sensor that has dynamics characterized by one or more coupled differential equations for the evolution of a state variable, and requires a state variable to cross an energy barrier or threshold, as in eh case of neurons and in the single core magnetometer that is described above. In addition, the invention is applicable to a sensor that has negative correlation between successive crossing intervals. In fact, any nonlinear dynamic device having dynamics that can be mathematically mapped onto fire-and-reset (or integrate-fire) dynamics, can be configured to read out in this manner. Almost all nonlinear sensors are of this type in that they have a threshold, and the threshold has to be reach by a stimulus. Once the stimuli is reached, the time is recorded, the sensor is reset, and there is a wait or interval before the threshold is reached again. It is important that the intervals between successive threshold crossings (also referred to as the inter-spike intervals) are negatively correlated to achieve the desired biomimetic accuracy of measurements described herein.

According to illustrative embodiment, the dynamics of a nonlinear senior are mapped onto the integrate-fire type of dynamics of active neurons. Thus, the sensors are able to perform accurate measurements, just as neurons do, even with small amounts of data taken over a small observation time, such as a few seconds or even less. Note that the sensor could operate much faster than a neuron. A typical neuron in a weakly electric fish conveys information about a stimulus with the rate 200-300 spikes/sec, for example. An optimal length of time-series is about 200 spikes, i.e., when the scaling in the resolution changes from 1/N to 1/sqrt(N). Therefore, the neuron needs ~1 sec to accurately code the signal. In contrast to the neuron, the oscillation frequency of the sensor is able to reach values about one or two orders higher: a few kHz to a few tens of kHz. hence, the observation time can be shorter than in the neuron. According to illustrative embodiments, the need for measuring large amounts of data over large observation times is removed, and there is no need to rely on averaging techniques, such as the Fourier Transforms, since measurements are made in the time domain and not in the frequency domain. Also, there is no need to smooth out the noise by averaging large quantities of data. A sensor configured as described above may truly be considered "biomimetic".

Having described the mathematical principles on which configuration of a biomimetic sensor is based, the following provides a description of a biomimetic sensor which may be configured as described above and a method for configuring and operating such a biomimetic sensor. This may be understood with reference to FIGS. 8A and 8B.

Figure 8A:
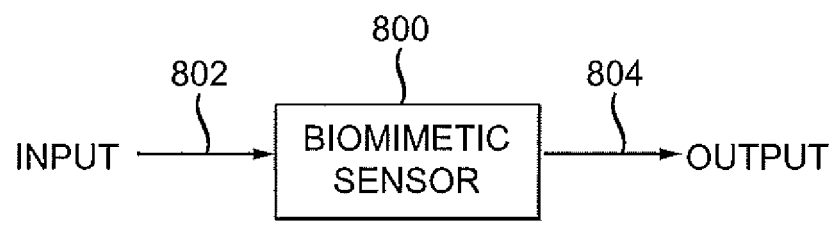
FIG. 8A illustrates a block diagram of a biomimetic sensor which may be configured according to illustrative embodiments described herein.

Referring first to FIG. 8A, a biomimetic sensor 800 is a nonlinear sensor having dynamics that are configured to mimic the threshold-crossing dynamics of an integrate-fire model neuron with negatively correlated inter-spike intervals. The sensor includes an input 802 for detecting input signals and an output 804 for providing measurements of the output signals. In the case of a biomimetic magnetometer, for example, the input 802 may simply be a field sensed by the ferromagnetic core, and the output 804 would be the resulting core magnetization. However, in this operation mode, the the output is the observation time $T_{ab}$, (or a quantity that is proportional to the observation time such as voltage or electric current) estimated from N time intervals, $T_i$, t=1, 2, . . . , N as $\tau_{ab} = \Sigma_{t=1}^{N} T_t$.

Figure 8B:
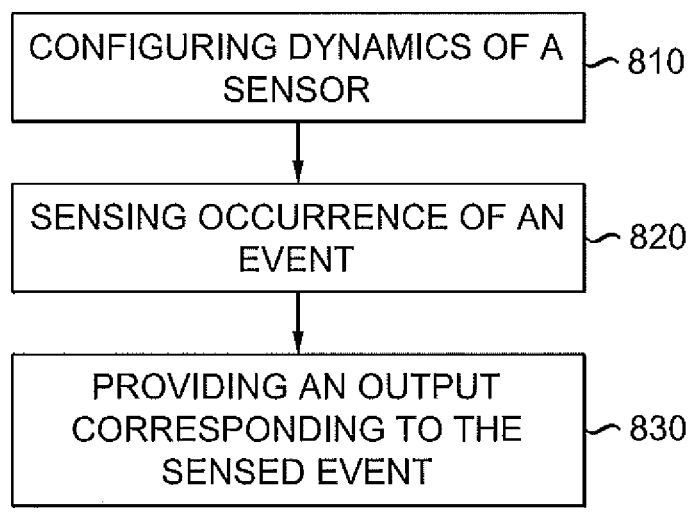
FIG. 8B illustrates a method for configuring and operating a biomimetic sensor according to illustrative embodiments described herein.

Referring to FIG. 8B, a method for configuring and operating a biomimetic sensor begins at step 810 at which the dynamics of a sensor, in particular a nonlinear sensor, to sense occurrence of a temporal event are configured with an accuracy that mimics neuron sensing. As described above, the dynamics of the sensor may be configured to mimic threshold-crossing dynamics of an integrate-fire neuron with negatively correlated inter-spike intervals. At step 820, the occurrence of the temporal event is detected by the sensor. At step 830, an output corresponding to the sensed temporal event is provided. Given the configuration of the sensor as described above, the output provided by the sensor will have an accuracy that mimics neuron sensing.

It will be understood that many additional changes in the details, materials, steps, and arrangement of parts, which have been described herein and illustrated to explain the nature of the invention, may be made by those skilled in the art within the principle and scope of the invention as expressed within the appended claims.

What is claimed is:

1. A device, comprising:
   a nonlinear, biomimetic sensor with dynamics configured to sense occurrence of a temporal event with an accuracy that mimics neuron sensing, wherein the dynamics of the sensor are characterized by one or more coupled differential equations for evolution of a state variable, and the sensor requires a state variable to cross an energy barrier or threshold, and wherein there is negative correlation between successive crossing intervals;
   wherein the sensor is a magnetometer having nonlinear ferromagnetic core dynamics configured to mimic the threshold-crossing dynamics of an integrate-fire model neuron with negatively correlated inter-spike intervals by associating increasing magnetization with an increasing cell membrane voltage and associating decreasing magnetization with a reset in the cell membrane voltage; and an output configured to provide an output signal corresponding to the sensed event.

2. The device of claim 1, wherein the threshold-crossing dynamics of the integrate-fire neuron are given by an equation:

$$v=\beta+s$$

where s is a signal to be estimated, β is a constant bias current, and v is a voltage across a neural membrane.

3. A method, comprising:
configuring dynamics of a nonlinear, biomimetic sensor, wherein the dynamics of the sensor are characterized by one or more coupled differential equations for evolution of a state variable, and the sensor requires a state variable to cross an energy barrier or threshold, and wherein there is negative correlation between successive crossing intervals;

wherein the sensor is a magnetometer having nonlinear ferromagnetic core dynamics configured to mimic the threshold-crossing dynamics of an integrate-fire model neuron with negatively correlated inter-spike intervals by associating increasing magnetization with an increasing cell membrane voltage and associating decreasing magnetization with a reset in the cell membrane voltage; and sensing the occurrence of the temporal event by the sensor.

4. The method of claim 3, further comprising providing an output signal corresponding to the sensed temporal event.

5. The method of claim 3, wherein the threshold-crossing dynamics of the integrate-fire neuron are given by an equation:

$$v=\beta+s$$

where s is a signal to be estimated, β is a constant bias current, and v is a voltage across a neural membrane.

6. The method of claim 3, comprising the step of operating the sensor in "biomimetic mode" such that the sensor mimics oscillatory dynamics of a perfect-integrate-fire model with negative correlations in its inter-spike intervals to exploit a noise canceling mechanism.

7. A biomimetic device, comprising:
a nonlinear, biomimetic sensor with dynamics configured to sense occurrence of a temporal event with an accuracy that mimics neuron sensing wherein the dynamics of the sensor are further configured to mimic the threshold-crossing dynamics of an integrate-fire model neuron with negatively correlated inter-spike intervals and wherein the threshold-crossing dynamics of the integrate-fire neuron are given by an equation:

$$v=\beta+s$$

where s is a signal to be estimated, β is a constant bias current, and v is a voltage across a neural membrane;

wherein the sensor is a magnetometer having nonlinear ferromagnetic core dynamics configured to mimic the threshold-crossing dynamics of an integrate-fire model neuron with negatively correlated inter-spike intervals by associating increasing magnetization with an increasing cell membrane voltage and associating decreasing magnetization with a reset in the cell membrane voltage; and an output configured to provide an output signal corresponding to the sensed event.

* * * * *